United States Patent
Ghetie et al.

(10) Patent No.: US 11,468,170 B2
(45) Date of Patent: Oct. 11, 2022

(54) TECHNIQUES FOR PROCESSOR BOOT-UP

(71) Applicant: Intel Corporation, Santa Clara, CA (US)

(72) Inventors: Sergiu D. Ghetie, Hillsboro, OR (US); Wojciech Powiertowski, Beaverton, OR (US); Jeanne Guillory, Hillsboro, OR (US); Neeraj S. Upasani, Portland, OR (US); Srihari Narayanan, Hillsboro, OR (US); Mohan J. Kumar, Aloha, OR (US); Sagar V. Dalvi, Hillsboro, OR (US); Francisco Orlando C. Arbildo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 16/213,962

(22) Filed: Dec. 7, 2018

(65) Prior Publication Data
US 2019/0108347 A1   Apr. 11, 2019

(51) Int. Cl.
*G06F 21/57* (2013.01)
*G06F 9/4401* (2018.01)
*G06F 9/22* (2006.01)

(52) U.S. Cl.
CPC .............. *G06F 21/575* (2013.01); *G06F 9/22* (2013.01); *G06F 9/4406* (2013.01); *G06F 9/4408* (2013.01); *G06F 9/4416* (2013.01); *G06F 9/4418* (2013.01)

(58) Field of Classification Search
CPC ........ G06F 13/102; G06F 21/575; G06F 9/22; G06F 9/4406; G06F 9/4408; G06F 9/4416; G06F 9/4418
See application file for complete search history.

(56) References Cited

U.S. PATENT DOCUMENTS

| 7,293,165 | B1 | 11/2007 | Tobias | |
|---|---|---|---|---|
| 2004/0098575 | A1 | 5/2004 | Datta et al. | |
| 2008/0022134 | A1* | 1/2008 | Wang | G06F 21/10 713/193 |
| 2016/0291985 | A1* | 10/2016 | Jenkins | G06F 3/0679 |
| 2016/0300064 | A1* | 10/2016 | Stewart | G06F 3/0619 |

OTHER PUBLICATIONS

Amitav Halder, etc., "Method for Booting ARM Based Multi-Core SoCs", (Freescale Semiconductor India Pvt. Ltd.), Retrieved from https://www.design-reuse.com/articles/38128/method-for-booting-arm-based-multi-core-socs.html on Dec. 7, 2018, 6 pages.

(Continued)

*Primary Examiner* — Terrell S Johnson
(74) *Attorney, Agent, or Firm* — Compass IP Law PC (57) ABSTRACT

A processor can be configured to access boot firmware from a remote location independent from use of a chipset. After a processor powers-on or reboots, the processor can execute microcode. The microcode will cause the processor to train a link with a remote device. The remote device can provide the processor with access to boot firmware. The processor can copy the boot firmware to the processor's cache or memory. The processor will attempt to authenticate the boot firmware. If the boot firmware is authenticated, the processor executes the copy of the boot firmware.

20 Claims, 9 Drawing Sheets

(56) References Cited

OTHER PUBLICATIONS

BIOS—Wikipedia, "BIOS", Retrieved from "https://en.wikipedia.org/w/index.php?title=BIOS&oldid=866559040", This page was last edited on Oct. 31, 2018, at 02:26 (UTC). 20 pages.
Eswaramoorthi Nallusamy, "A Framework for Using Processor Cache as RAM (CAR)", University of New Mexico, Oct. 10, 2005, 25 pages.
Intel, "Redundant SPI Flash Support with Failover Boot Design for Intel® Architecture Platforms Application Note", Oct. 2014, 40 pages.
Jenny M Pelner, etc., INTEL, "Minimal Intel Architecture Boot Loader", Jan. 2010, 26 pages.
Extended European Search Report for Patent Application No. 19207613.1, dated Mar. 27, 2020, 13 pages.
European First Office Action for Patent Application No. 19207613.1, dated Mar. 5, 2021, 6 pages.

\* cited by examiner

TECHNIQUES FOR PROCESSOR BOOT-UP

TECHNICAL FIELD

Various examples are described herein that relate to processor boot-up.

BACKGROUND

Many computer systems include hardware components such as processors, memory, storage, video, graphics, and networking resources. During start-up, many computer systems with processors execute a boot firmware code. The boot firmware code can be the first software that the processor executes after powering-up. An example boot firmware is a Basic Input/Output System (BIOS). In many cases, the boot firmware is pre-installed on a computer's system board. The processor-executed boot firmware performs hardware initialization and provides runtime services for an operating system and other programs.

DETAILED DESCRIPTION

Figure 1:
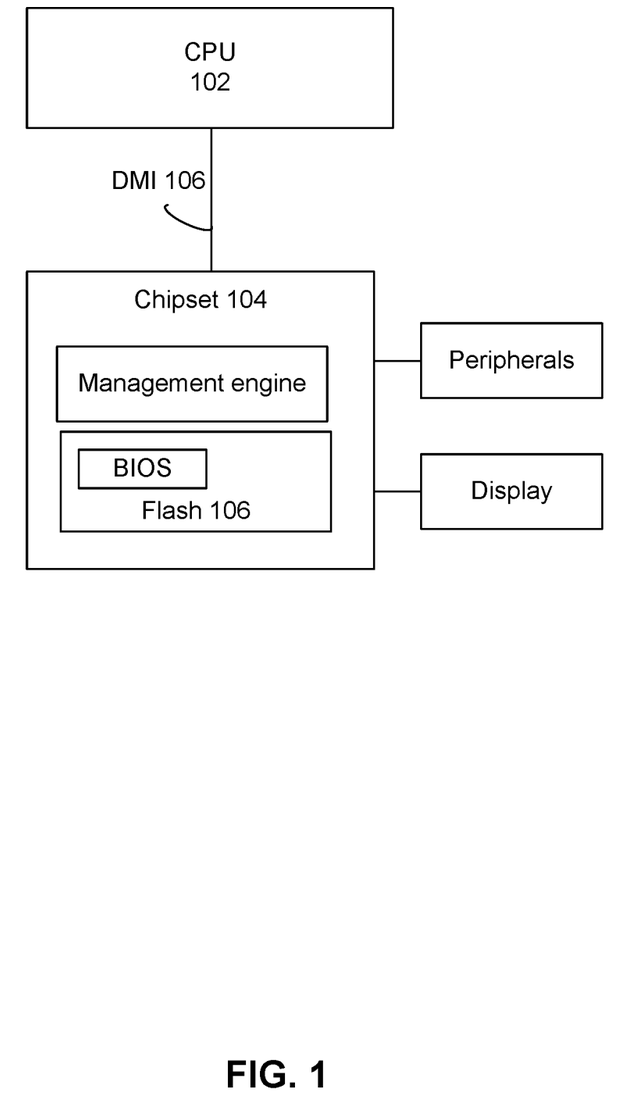
FIG. 1 depicts an example system.

Many computing systems use chipsets to provide interconnection between the central processing unit (CPU), memory, storage, graphics engines, display engines, network interfaces, and peripheral devices such as displays or user interfaces (e.g., keyboard or mouse). One example of a chipset is an Intel® Platform Controller Hub (PCH). FIG. 1 depicts an example computing platform. Chipset 104 controls certain data paths and support functions used in conjunction with processors such as the system clock, Flexible Display Interface (FDI) to support a processor with integrated graphics, and Direct Media Interface (DMI). CPU 102 is connected to chipset 104 using a DMI compliant link.

During a boot operation, CPU 102 sees internal devices available on chipset 104 and is able to map a Serial Peripheral Interface (SPI) flash memory with boot firmware. The boot firmware is stored in non-volatile flash 106 that is integrated into and connected to chipset 104. Execution of the boot firmware can cause scanning of all the attached devices (e.g., network interface, random access memory (RAM), peripherals, display, and so forth) and prepare attached devices so that the operating system and software can use them.

Chipset 104 can provide functionality that some customers do not use or the functionality could be provided in devices separate from the chipset. In some known computer system platforms, booting a processor is tied to use of a chipset such that the processor is programmed to locate boot firmware from a storage in the chipset. Various embodiments provide for a processor to load boot firmware from a remote storage device independent of use of a chipset to provide the boot firmware. For example, loading boot firmware using DMI link from a SPI controller inside a PCH chipset can be skipped. A processor's microcode can be configured to cause the processor to automatically train a link to a remote device. For example, a link can be Peripheral Component Interconnect express (PCIe) compliant. The remote device can be a field programmable gate array (FPGA), Baseboard Management Controller (BMC), a storage device, or other device. The microcode can be configured or modified for example using patch-in-fuse whereby changes to code stored in a read only memory (ROM), which can be part of a CPU, can occur after manufacturing of the CPU. A change to code stored in ROM can occur using a ROM patch that is placed in a CPU fuse or fuses where a fuse can be a programmable analog structure in the CPU silicon. After or at an overlapping time as training the link, the processor can retrieve or receive an offset value. The processor can use the offset value as an offset from a starting addressable storage location accessible through the remote device. For example, the processor can request retrieval of the boot firmware starting at an offset from a first addressable storage location. After receiving the boot firmware, the processor or its delegate can authenticate the boot firmware. For example, a key can be used to authenticate a portion of an entirety of the boot firmware. The key can be stored in a non-volatile storage accessible by the processor. If the boot firmware is authenticated, the boot firmware can be executed. Subsequently, the processor can load an operating system and execute the operating system.

Various embodiments can potentially reduce computer platform cost and increase compute density by permitting a processor that can load and execute boot firmware without using a chipset. Using a linked device to provide boot firmware can allow platform sellers to build or sell custom platform solutions.

Various embodiments can potentially improve a security of a compute platform through removal of a chipset by reducing a trusted compute base (TCB). In some cases, using a chipset for boot operations involves use of code not related to boot and that code can be compromised and cause unauthorized uses or manipulations of the compute platform.

Figure 2A:
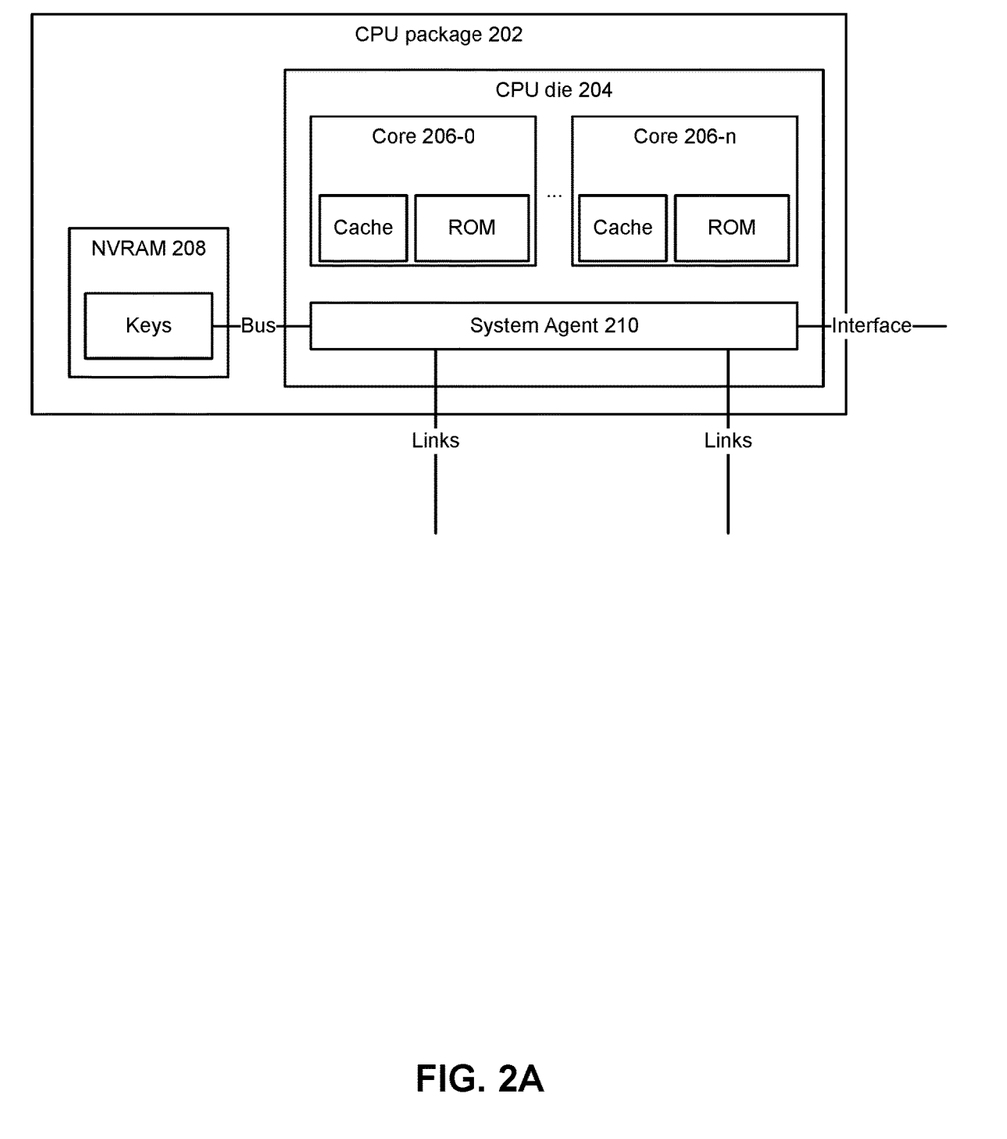
FIG. 2A depicts an example of a processor.

FIG. 2A depicts an example of a processor. In this example, a central processing unit (CPU) package 202 includes a CPU die 204 and a non-volatile random access memory (NVRAM) 208. CPU die 204 can include one or more cores 206-0 to 206-n. A core can be a processor, execution core, or computational engine that is capable of executing instructions. Each of cores 206-0 to 206-n can have access to their own cache and read only memory (ROM), or they can share cache or ROM. Cores 206-0 to 206-n can be homogeneous and/or heterogeneous devices. Any type of inter-processor communication techniques can be used, such as but not limited to messaging, inter-process-sor interrupts (IPI), inter-processor communications, and so forth. Cores 206-0 to 206-n can be connected in any type of manner, such as but not limited to, bus, ring, or mesh. One or more of cores 206-0 to 206-n can execute microcode stored in ROM to cause retrieval of a remote boot firmware. One or more of cores 206-0 to 206-n can execute boot firmware retrieved from a remote device. After execution of an authenticated boot firmware, one or more of cores 206-0 to 206-n can execute an operating system.

CPU die 204 can also include a system agent 210. System agent 210 can include or more of: a memory controller, a shared cache, a cache coherency manager, arithmetic logic units, floating point units, core or processor interconnects, or bus or link controllers. System agent 210 can provide access to external devices using links such as one or more of: a PCI express (PCIe) link compliant for example with PCIe Specification Version 4.0 (2017) and earlier or later version, an Intel® Ultra Path Interconnect (UPI) link, an Intel® Quick- Path Interconnect (QPI), or an System Management Bus (SMBus) link. For example, system agent 210 can provide access to an NVRAM 208 using a bus. For example, the bus can comply with SMBus or SPI, and so forth. Any link can comply with one or more than one standard or specification. System agent 210 can provide one or more of: DMA engine connection, non-cached coherent master connection, data cache coherency between cores and arbitrates cache requests, or Advanced Microcontroller Bus Architecture (AMBA) capabilities. One or more links can be a Direct Media Interface (DMI) compliant link that is used to communicate using PCIe with a remote device to retrieve boot firmware.

At least one of the PCIe compatible links can be used to connect CPU die 204 with a remote device that provides access to boot firmware. One or more core 206-0 to core 206-n can access the boot firmware in accordance with embodiments described herein.

FIGS. 2B-2F depict an example manner by which a processor can access and use boot firmware from a remote device. Various embodiments allow boot of processor 222 (or any core) from using boot firmware made available using a remote device. Processor 222 uses link 230 to copy firmware from remote device 232 or storage device 234 accessible by remote device 232. Remote device 232 can be implemented as programmable gate array (FPGA), Baseboard Management Controller (BMC), a storage device, or other device. Link 230 can be compatible with PCIe, DMI, or other standards. The techniques described herein can be used for boot firmware loading by a processor that is used by any type of computing environment, including, but not limited to, a network interface device that uses processors, a graphics processing unit, an internet of things (IoT) device, and so forth.

Figure 2B:
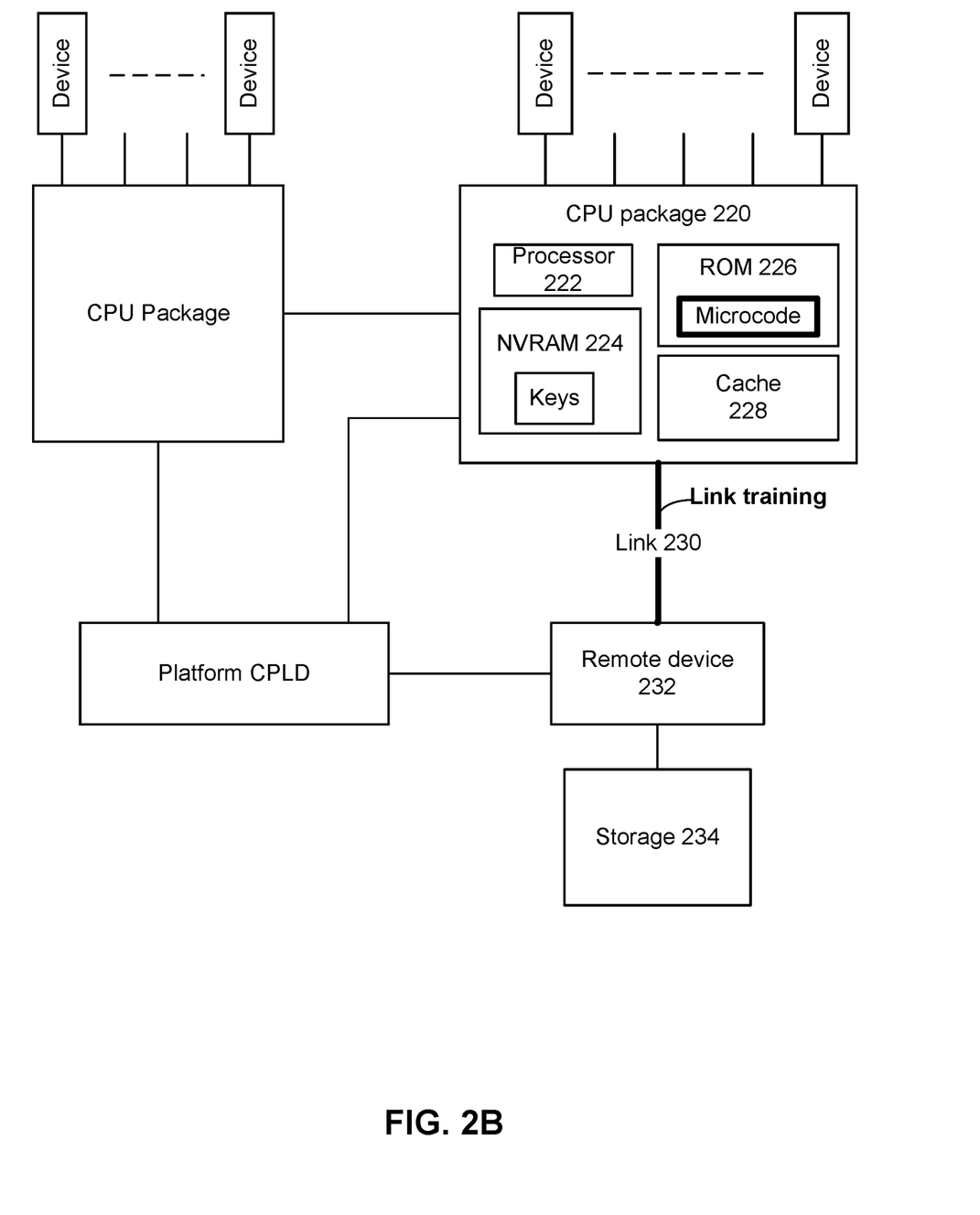
FIGS. 2B-2F depict examples by which a processor can access and use boot firmware from a remote device.

In the example of FIG. 2B, after start-up or restart, processor 222 executes microcode. The microcode can be stored in ROM 226 by a manufacturer of CPU package 220 or processor 222. In addition to other activities, execution of the microcode can cause processor 222 to perform link training over link 230 for communication with remote device 232. CPU package 220 can have multiple links available to connect with external devices. Selection of link 230 among the multiple links to connect with remote device 232 can be set using a hardcoded identifier or sent using a SMBus link (or other link) so that processor 222 interacts with the right remote device to retrieve boot firmware. Other devices connected to CPU package 220 using links include one or more of: a graphics processing unit (GPU), network interfaces, storage accelerator devices, and so forth.

Other implementations of remote device 232 can be Intel® Arria10® system on chip (SOC), ASPEED AST2400, and other implementations. Some examples of remote device 232 can perform one or more of: platform management, keyboard/video/mouse interface, web interface for controlling keyboards, video monitors or mouse (KVM), a video interface, a Universal Serial Bus (USB) interface, temperature monitoring, platform reset, video buffer, out of band (OOB) updating of boot firmware, and so forth. If a chipset is not used, remote device 232 could be soldered or mounted to a motherboard that is communicatively coupled to CPU package 220 and/or remote device 232 could be provided as a pluggable PCIe device.

Link 230 does not need to be dedicated to retrieval of boot firmware. After boot and loading of operating system into CPU package 220, link 230 can be used for other purposes.

Figure 2C:
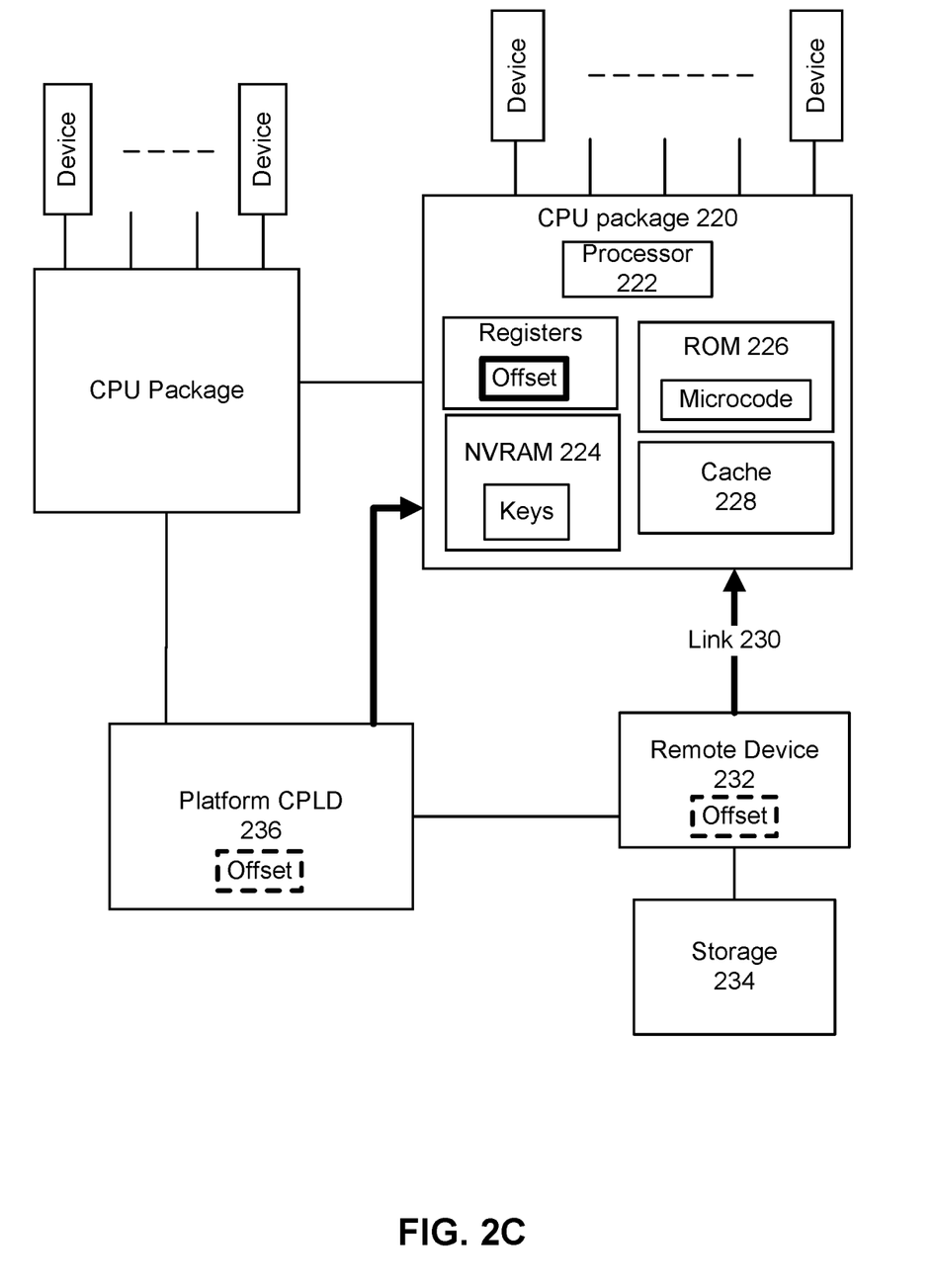

In the example of FIG. 2C, execution of microcode by one or more cores in processor 222 causes retrieval of an offset value that can be used to access a boot firmware package. The offset value can be retrieved from one or more of platform CPLD 236 or remote device 232. A cloud customer can program the offset into platform CPLD 236 or remote device 232. In another example, one or more cores in processor 222 can retrieve the offset and store the offset in a register or other memory or storage of the CPU package 220 or a CPU die 204. In an embodiment, either platform CPLD 236 or remote device 232 could transmit the offset to CPU package 220 for storage in a register, memory, storage, or cache. For example, an SMBus connection or a connection that does not need link training may be used to transmit the offset from platform CPLD 236 to CPU package 220.

Figure 2D:
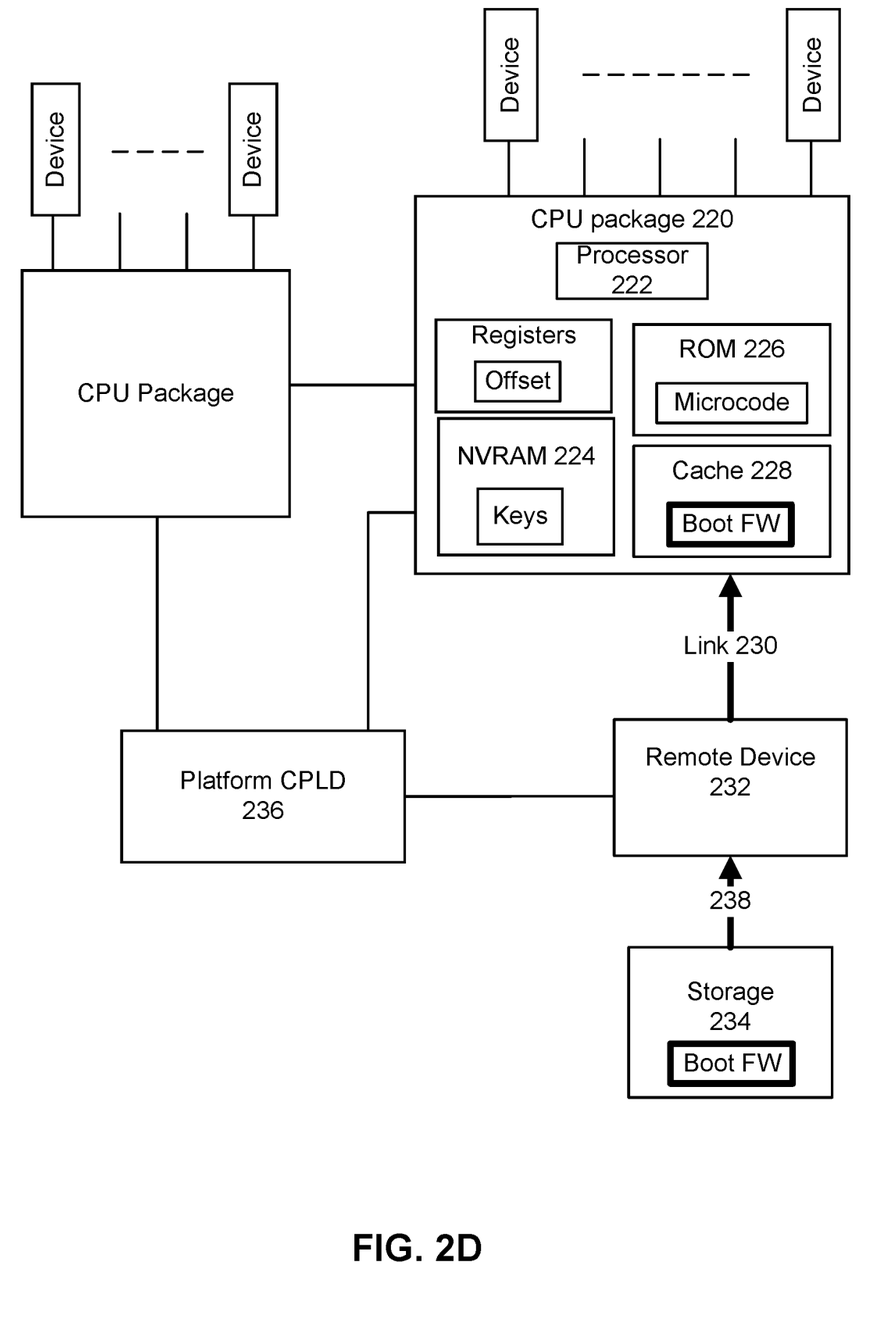

In the example of FIG. 2D, one or more cores of processor 222 can apply the offset to retrieve a boot firmware package (shown as Boot FW) from a storage location in storage 234. Boot firmware can be Unified Extensible Firmware Interface (UEFI), BIOS, CPU microcode update, and so forth. The UEFI Forum develops specifications that define a software interface between an operating system and platform firmware or hardware. A microcode update can cause an update or change to a version of the microcode. Processor 222 can use link 230 to request remote device 232 to load the boot firmware package from starting at the offset from a beginning of storage 234 using link 238 and copy the boot firmware package into cache 228. Link 238 can comply with one or more of: SPI, embedded Multi-Media Controller (eMMC), non-volatile memory express (NVMe), and so forth. Cache 228 can be used as cache as RAM. Cache 228 can include one or more of level 2 (L2) or level 3 (L3) cache. In an example, link 230 is PCIe compatible and link 230 connects CPU package 220 with remote device 232. Remote device 232 can be responsible for managing content of storage 234 using link 238.

Figure 2E:
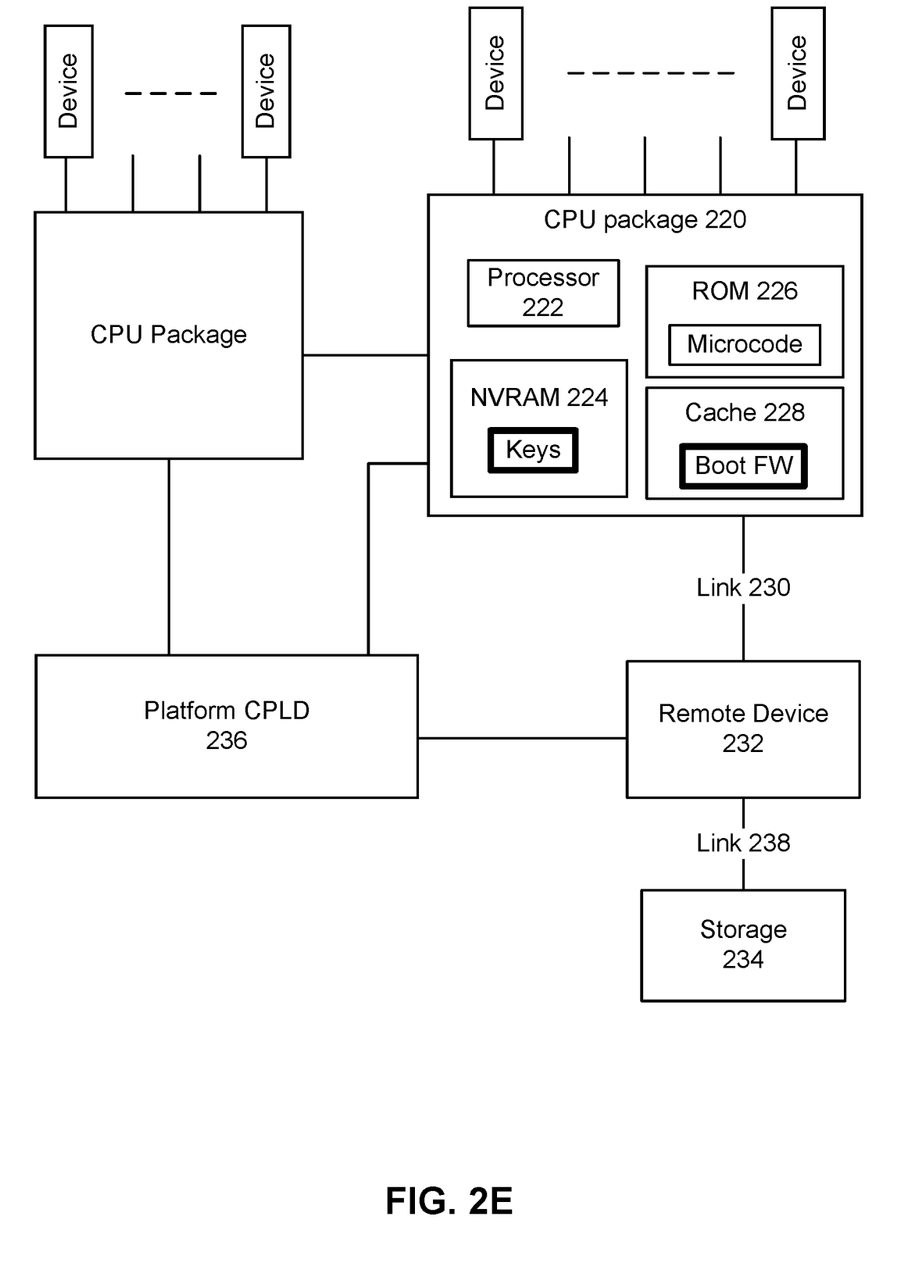

In the example of FIG. 2E, a processor can determine if the boot firmware package is authenticated. To provide a secure boot, core executed microcode performs or requests full signature authentication of the boot firmware image in cache 228 (e.g., cache as RAM) using a key(s) stored in NVRAM 224. In an embodiment, the boot firmware package can include a header and body. The key can be used to authenticate the header of the boot firmware package whereby the header has a digital signature and the signature can be verified using signature verification. If the signature is verified, then a portion of the boot firmware code in the body can be executed. For example, a user or owner of the CPU package 220 can store keys in NVRAM 224 and the boot firmware in storage 234. A signing server can specify keys and an encryption scheme for the boot firmware. In an embodiment, a core can use a dedicated security engine to authenticate the header or other portion of the boot firmware code package.

If authentication fails on the boot firmware code package, an error can be communicated to platform CPLD 236 and processor 222 can be shut down, suspended, or enter reduced power state. When CPLD 236 is a trusted source or root, CPLD 236 can manage recovery of the system including the CPU package 220 by providing boot firmware recovery. In some cases, remote device 232 can perform out-of-band firmware recovery.

Figure 2F:
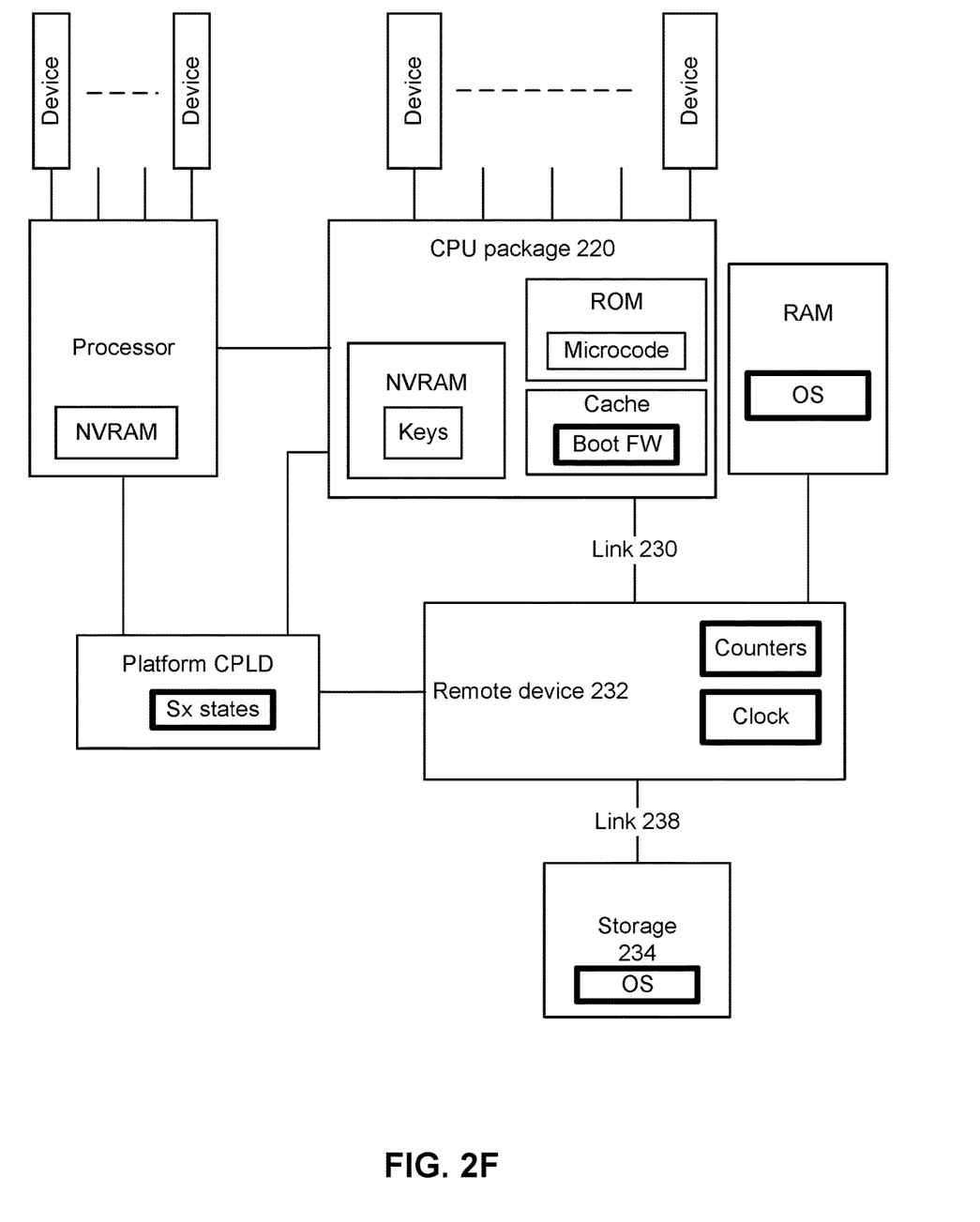

In the example of FIG. 2F, one or more cores of a processor can boot using authenticated boot firmware. The boot firmware can start execution from cache 228 and perform a boot process. The boot process can include one or more of: memory training, training of all links, device discovery, and so forth. Execution of the boot firmware can cause loading of an operating system (OS). The OS can be stored in a non-volatile memory such as storage 234 and be copied using link 238 through remote device 232 to random access memory accessible by the processor. A PCIe link can be used to transfer OS to RAM. For example, the OS can be accessible in PCIe space. Any type of operating system can be used such as but not limited to Mac OS, Microsoft Windows, Windows Server, and Linux.

A chipset can provide high-precision counters (HPET) and a real-time-clock (RTC) among others. But when a chipset is not used, in order to provide counters and clock signals, remote device 232 can provide CPU package 220 access to high-precision counters (HPET) and a real-time-clock (RTC), among others. Link 230 can be used to provide the CPU package 220 with access to the counters and clock.

A chipset can also provide sleep state transitions and platform power events. In an embodiment that does not use a chipset, package system sleep states (e.g., S0, S1, S2, and so forth) state transitions and platform power events can be communicated from the platform to the CPU package 220 by a platform CPLD 236 over a link (e.g., SMBus compliant). Platform CPLD 236 can sequence power to CPU package 220 and is aware of all power events in the platform.

Figure 3:
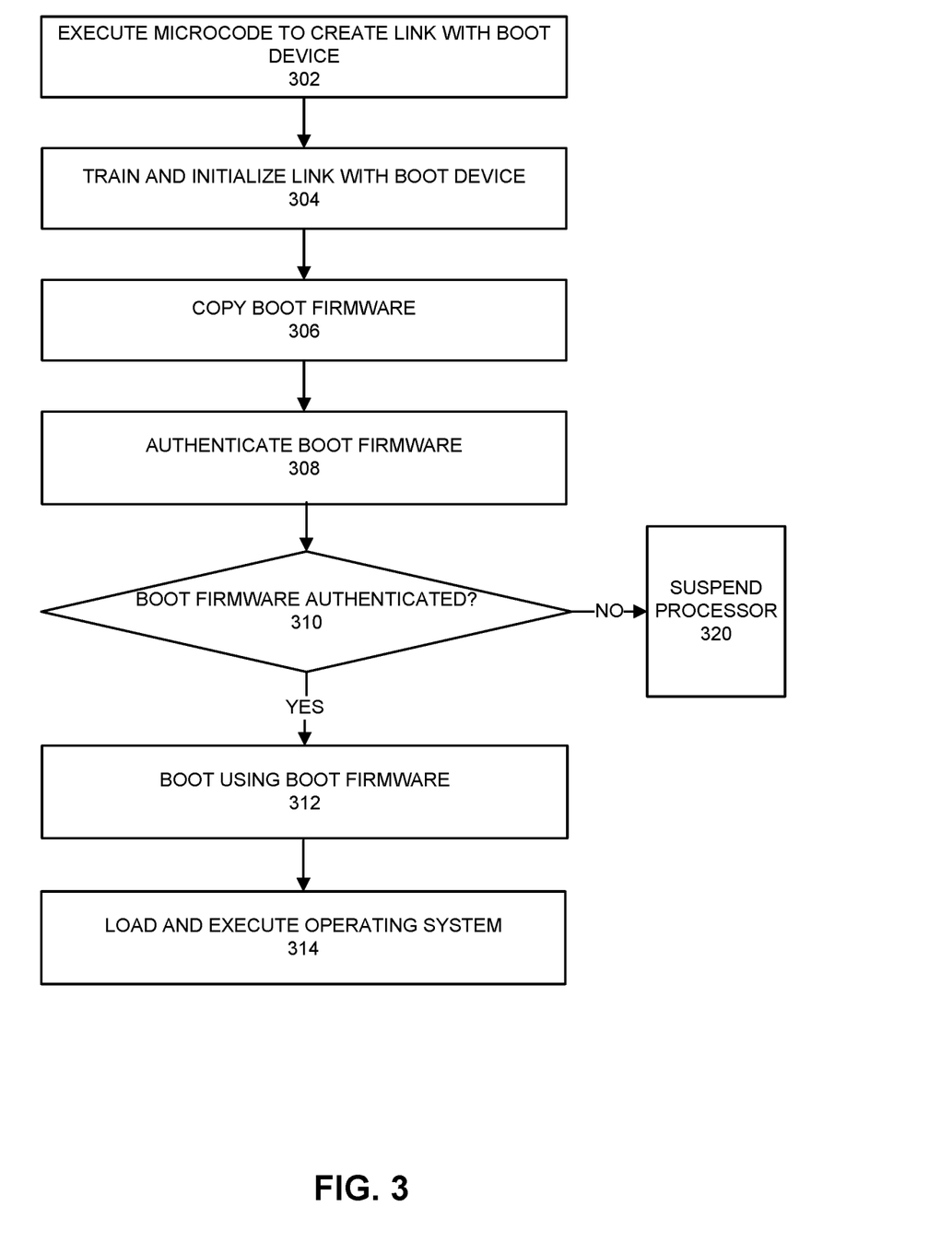
FIG. 3 depicts an example process that can be used in an embodiment.

FIG. 3 depicts an example process that can be used in an embodiment. The process can commence at processor power-up, start-up, or restart. The process can allow a processor to boot-up without use of a chipset. At 302, one or more cores of a processor executes microcode to create a specified link with a remote boot device. The link that is to be initialized can be set in the microcode. The link can be PCIe compliant or compliant with other standards. At 304, one or more cores of a processor train and initialize the link with the remote boot device. For example, if the link is SMBus, training can be skipped and a connection with remote boot device can be created.

At 306, one or more cores retrieve a boot firmware code package by communication with remote boot device. For example, the boot firmware code package can be retrieved from storage location starting at an offset specified to the one or more cores.

At 308, one or more cores authenticate the boot firmware code package. Authentication can be performed by a core executing microcode or dedicated authentication engine. For example, a boot firmware code package can include a header and payload portion. The payload portion can include a boot firmware. A key accessible to a core or security engine can be used to authenticate the header or any of the header and payload portion. At 310, a determination is made if the boot firmware code package is authenticated. If the boot firmware code is authenticated, then 312 can follow 310. If the boot firmware code package is not authenticated, then 320 can follow 310 whereby the processor is placed in a suspend state or powered down and a processor platform recovery operation can take place to provide another boot firmware.

At 312, one or more cores can boot using the authenticated boot code firmware. For example, boot code firmware can be one or more of: UEFI, BIOS, microcode update, and so forth. Execution of boot code firmware can cause one or more of: memory training, training of all links, device discovery, and so forth. At 314, execution of the boot code firmware can cause loading and subsequent execution of an operating system.

Figure 4:
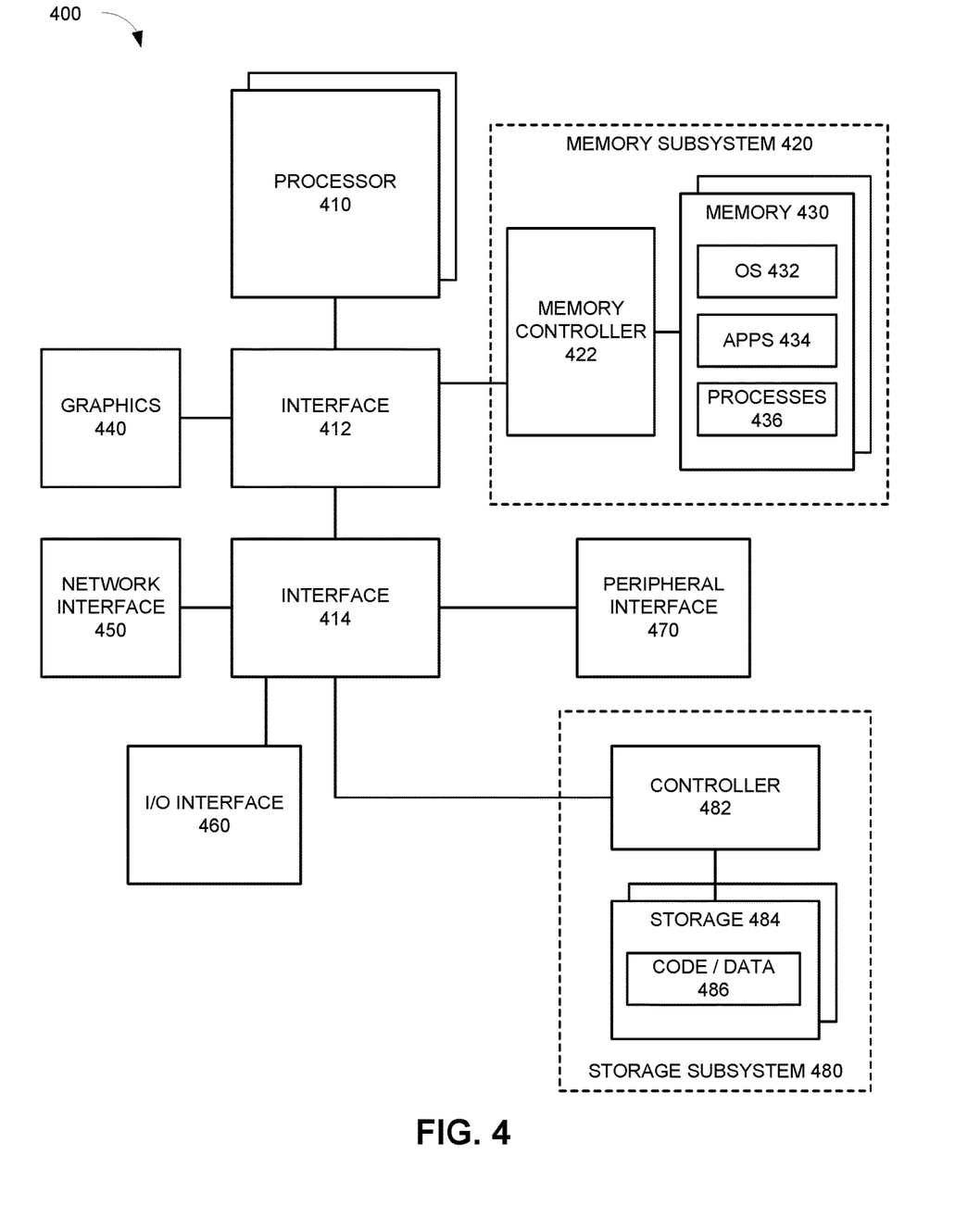
FIG. 4 depicts an example of a computing system.

FIG. 4 depicts an example of a computing system. System 400 represents a computing device in accordance with any example herein, and can be a laptop computer, a desktop computer, a tablet computer, a server, group of servers, a gaming or entertainment control system, routing or switching device, embedded computing device, a smartphone, a wearable device, an internet-of-things device or other electronic device.

System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface components 440. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 480p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 400 includes interface 414, which can be coupled to interface 412. In one example, interface 414 represents an interface circuit, which can include stand-alone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a remote device, which can include sending data stored in memory. Network interface 450 can receive data from a remote device, which can include storing received data into memory.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data 486 in a persistent state (i.e., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (i.e., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

In an example, system 400 can be implemented using interconnected compute sleds of processors, memories, storages, network interfaces, and other components. High speed interconnects can be used such as PCIe, Ethernet, or optical interconnects (or a combination thereof).

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Examples described herein can be applied to wired or wireless communication transmitters or transceivers. Examples can be used by or in connection with radio frequency (RF) transceiver components for accessing wireless voice and/or data networks (e.g., using cellular telephone technology, data network technology such as 3G, 4G/LTE, 5G, Wi Fi, other IEEE 802.11 family standards, or other mobile communication technologies, or any combination thereof), components for short range wireless communication (e.g., using Bluetooth and/or Bluetooth LE standards, NFC, etc.), and/or other components.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

What is claimed is:

1. An apparatus comprising:
   a plurality of links and
   at least one processor communicatively coupled to the plurality of links, wherein the at least one processor is to:
   select a link among the plurality of links to connect with a device, wherein the device is to provide access to a boot firmware package;
   train the selected link for communication with the device, wherein the selected link is to operate consistent with at least Peripheral Component Interconnect express (PCIe); and
   execute microcode that is to cause retrieval of a Unified Extensible Firmware Interface (UEFI) boot firmware package from the device using the trained selected link.

2. The apparatus of claim 1, wherein the at least one processor is to cause retrieval of the boot firmware package by communication with the device.

3. The apparatus of claim 1, wherein the boot firmware package is stored at an offset from a reference addressable location in a storage accessible by the device.

4. The apparatus of claim 1, wherein the at least one processor is to validate the boot firmware package and selectively execute boot firmware in the boot firmware package based on validation of the boot firmware package.

5. The apparatus of claim 4, wherein the at least one processor is to suspend operation based on failed validation of the boot firmware package.

6. The apparatus of claim 4, wherein execution of the boot firmware is to cause one or more of: memory training, link training, device discovery, or loading and execution of an operating system.

7. The apparatus of claim 1, wherein at least one link of the plurality of links is to operate consistent with SMBus.

8. A method comprising:
   training a link with a boot device, wherein the link operates consistent with at least Peripheral Component Interconnect express (PCIe);
   requesting a copy of a boot firmware using the link, wherein the boot firmware comprises Unified Extensible Firmware Interface (UEFI);
   authenticating the copy of the boot firmware; and
   executing the copy of the boot firmware based on successful authentication of the copy.

9. The method of claim 8, comprising executing microcode, wherein executing the microcode causes the training, requesting, and authenticating.

10. The method of claim 8, wherein the link complies with SMBus.

11. The method of claim 8, wherein requesting a copy of a boot firmware using the link comprises:
discovering a storage area accessible to the boot device and
requesting the copy at an offset into the storage area.

12. The method of claim 8, wherein authenticating the copy of the boot firmware comprises authenticating at least a portion of the copy based on a key.

13. The method of claim 12, comprising:
suspending at least one processor based on failed authentication of the copy of the boot firmware.

14. The method of claim 8, wherein:
executing the copy of the boot firmware causes one or more of: memory training, link training, device discovery, or loading and execution of an operating system.

15. A system comprising:
a processor comprising at least one core, a cache, and a non-volatile memory;
a link; and
a boot device communicatively coupled to the processor using the link, wherein:
the processor is to execute a microcode and
execution of the microcode to:
train the link, wherein the link is to operate consistent with at least Peripheral Component Interconnect express (PCIe),
copy a boot firmware to the cache from a storage location accessible to the boot device, wherein the boot firmware comprises Unified Extensible Firmware Interface (UEFI), and
execute the boot firmware from the cache based on authentication of the boot firmware.

16. The system of claim 15, wherein the processor is to authenticate the boot firmware based on a key stored in the non-volatile memory.

17. The system of claim 15, wherein the processor is to suspend operation based on failed authentication of the boot firmware.

18. The system of claim 15, wherein execution of the boot firmware comprises one or more of: memory training, link training, device discovery, or execution of an operating system.

19. The system of claim 15, wherein the link complies with SMBus.

20. The system of claim 15, further comprising one or more of:
a network interface communicatively coupled to the processor;
a storage device communicatively coupled to the processor; or
one or more links communicatively coupled to the processor, the one or more links to provide coupling to one or more peripheral devices.

* * * * *